United States Patent
Ridgill, II et al.

(10) Patent No.: US 11,012,818 B2
(45) Date of Patent: May 18, 2021

(54) CROWD-SOURCED DEVICE CONTROL

(71) Applicant: INTERNATIONAL BUSINESS MACHINES CORPORATION, Armonk, NY (US)

(72) Inventors: Stephen Paul Ridgill, II, Raleigh, NC (US); Randy A. Rendahl, Raleigh, NC (US); Ashley Kristin Silva, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/533,351

(22) Filed: Aug. 6, 2019

(65) Prior Publication Data

US 2021/0044929 A1    Feb. 11, 2021

(51) Int. Cl.
| | |
|---|---|
| *H04W 4/029* | (2018.01) |
| *H04W 4/02* | (2018.01) |
| *H04L 12/26* | (2006.01) |
| *H04W 24/08* | (2009.01) |
| *G01S 19/26* | (2010.01) |

(52) U.S. Cl.
CPC ........... *H04W 4/029* (2018.02); *H04L 43/10* (2013.01); *H04W 4/027* (2013.01); *H04W 24/08* (2013.01); *G01S 19/26* (2013.01)

(58) Field of Classification Search
CPC ..... H04W 4/029; H04W 24/08; H04W 4/027; H04L 43/10; G01S 19/26; H04M 1/7253; H04M 1/72572; H04M 2250/12; H04M 19/02
See application file for complete search history.

(56) References Cited

U.S. PATENT DOCUMENTS

| | | | |
|---|---|---|---|
| 9,369,861 B2 | 6/2016 | Baker et al. | |
| 2009/0203370 A1* | 8/2009 | Giles | H04M 1/72572 |
| | | | 455/418 |
| 2013/0225152 A1 | 8/2013 | Matthews, III et al. | |
| 2014/0179295 A1 | 6/2014 | Luebbers et al. | |
| 2015/0079962 A1* | 3/2015 | Baker | H04W 8/18 |
| | | | 455/418 |

(Continued)

OTHER PUBLICATIONS

"Cinemute—Apps on Google Play," [online]retrieved Feb. 18, 2019, retrieved from the Internet: <https://play.google.com/store/apps/details?id=com.northshore.cinemutefull>, 1 pg.

(Continued)

*Primary Examiner* — Jaime M Holliday
(74) *Attorney, Agent, or Firm* — Cuenot, Forsythe & Kim, LLC

(57) ABSTRACT

Crowd-sourced device control can include monitoring a physical state associated with a user of the mobile device and performing relevant-device polling in response to detecting a change in the physical state associated with the user. Crowd-sourced device control also can include determining an operational parameter setting for the mobile device based on a relevant-device consensus determined by the relevant-device polling. Responsive to the operational parameter setting, as determined based on the relevant-device consensus, being different than a current setting of the operational parameter, a response action by the mobile device can be initiated.

8 Claims, 5 Drawing Sheets

(56) References Cited

U.S. PATENT DOCUMENTS

| | | | |
|---|---|---|---|
| 2016/0044151 A1 | 2/2016 | Shoemaker et al. | |
| 2016/0065722 A1* | 3/2016 | Rose ................. | H04M 1/72572 |
| | | | 370/338 |
| 2017/0118660 A1* | 4/2017 | Griffin ................. | H04W 24/02 |
| 2017/0358276 A1* | 12/2017 | Mese ....................... | G09G 5/10 |

OTHER PUBLICATIONS

Wallen, J., "Intelligent Ringer Adjusts Your Ringer Volume Based on Ambient Noise," [online] TechRepublic, Mobility,in Smartphones, Apr. 18, 2013 [retrieved Feb. 18, 2019], retrieved from the Internet: <https://www.techrepublic.com/blog/smartphones/intelligent-ringer-adjusts-your-ringervolume-based-on-ambient-noise/>, 8 pg.

Burns, C., "Theater Mode Will Auto-Silence Your Phone at the Movies," [online] SlashGear, Jan. 19, 2015 [retrieved Feb. 18, 2019], retrieved from the Internet: <https://www.slashgear.com/theater-mode-will-auto-silence-your-phone-at-the-movies-19365210/>, 2 pg.

* cited by examiner

CROWD-SOURCED DEVICE CONTROL

BACKGROUND

This disclosure relates to wireless mobile devices, and more particularly, to mechanisms for enhancing the use of such devices.

The rapid and continuing growth in the use of mobile phones and other wireless devices is well-known. Such devices enable users to communicate with others over vast distances from virtually any location. With the convergence of telephony and computing, most mobile devices such as smartphones and laptops combine wireless communication and computing capabilities in a single, multi-purpose mobile device.

SUMMARY

In one or more embodiments, a method includes monitoring, with a mobile device, a physical state associated with a user of the mobile device. The method also can include performing, with the mobile device, relevant-device polling in response to detecting a change in the physical state associated with the user. Additionally, the method can include determining, with the mobile device, an operational parameter setting for the mobile device based on a relevant-device consensus determined by the relevant-device polling. The method further can include initiating a response action by the mobile device responsive to the operational parameter setting, as determined based on the relevant-device consensus, being different than a current setting of the operational parameter.

In one or more embodiments, a system includes a processor of a mobile device configured to initiate operations of the mobile device. The operations include monitoring a physical state associated with a user of the mobile device. The operations also can include performing relevant-device polling in response to detecting a change in the physical state associated with the user. Additionally, the operations can include determining an operational parameter setting for the mobile device based on a relevant-device consensus determined by the relevant-device polling. The operations also can include initiating a response action responsive to the operational parameter setting, as determined based on the relevant-device consensus, being different than a current setting of the operational parameter.

In one or more embodiments, a computer program product includes a computer readable storage medium having program instructions stored thereon. The program instructions are executable by a processor of a mobile device to cause the mobile device to initiate operations comprising. The operations can include monitoring a physical state associated with a user of the mobile device. The operations also can include performing relevant-device polling in response to detecting a change in the physical state associated with the user. Additionally, the operations can include determining an operational parameter setting for the mobile device based on a relevant-device consensus determined by the relevant-device polling. The operations also can include initiating a response action responsive to the operational parameter setting, as determined based on the relevant-device consensus, being different than a current setting of the operational parameter.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
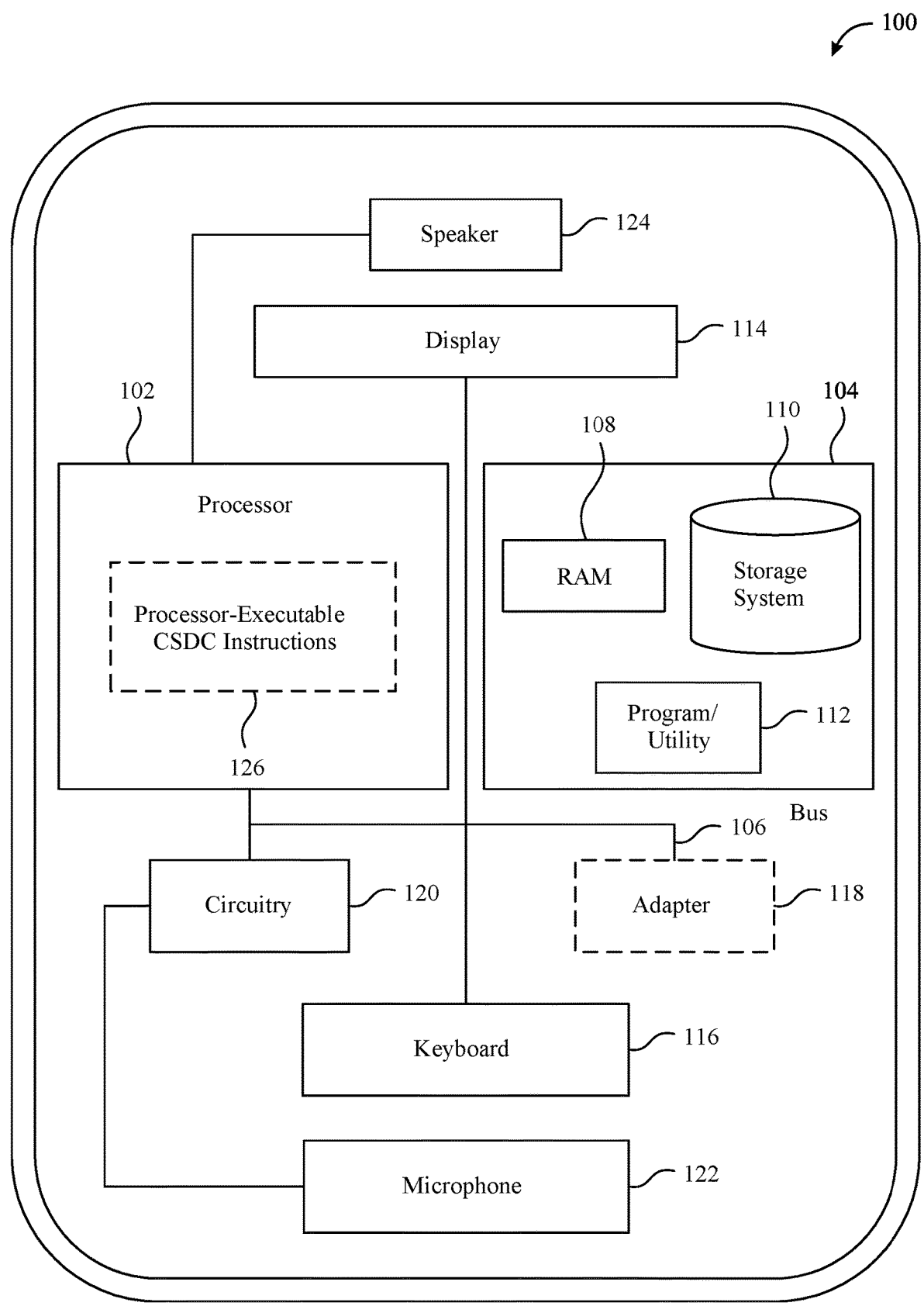
FIG. 1 depicts a mobile device that incorporates a crowd-sourced device control system according to an embodiment of the invention.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to wireless mobile devices, and more particularly, to mechanisms for enhancing the use of such devices. Notwithstanding the efficiency and convenience provided by mobile devices, such devices can sometimes be a disruption. An all-too-familiar disruption is a ringtone or other sound coming from a user's mobile device when the user is in the midst of a group of individuals in a conference room, theater, place of worship, or social gathering place. Many device disruptions are a mere matter of forgetfulness. A user enters a theater, but forgets to mute a cell phone, or the user opens a laptop without dimming the display screen in a darkened conference room during someone else's slide presentation.

Some devices are configured to change the operational parameters of a mobile device to avoid device disruptions. For example, some devices are configured to respond to ambient noise levels. If surrounding sounds are quiet, a user's mobile device (e.g., cell phone) can change to vibrate mode. If the surrounding noise is loud, the mobile device can increase sound volume, which may be an adequate response in some situations (e.g., a loud concert), but in others (e.g., movie theater) it is the wrong response. For example, in a movie theater ambient noise is likely to be loud, at least intermittently during a movie, and an automatic action that turns up a device's volume (e.g., cell phone ringer) rather than turning the sound down is obviously the wrong response to ambient sounds. Another approach for avoiding device disruptions is the installation of signal blockers at a venue. The approach, however, shifts responsibility and expense for mitigating device disruptions onto the venue owner. Moreover, blockers typically render all communication impossible, which can be detrimental to individuals (e.g., on-call doctors) who need at least a minimal level of communication.

The methods, systems, and computer program products disclosed herein mitigate device disruptions by determining appropriate operational parameters for a mobile device based on a consensus of other mobile devices. Based on the consensus, the likelihood of device disruption can be mitigated by determining when a predetermined portion of similarly situated mobile devices uniformly exhibit a specific setting for an operational parameter (e.g., muted sound volume or reduced brightness of a display screen) of the mobile devices.

In accordance with the inventive arrangements disclosed herein, a mobile device can monitor a physical state associated with a mobile device user and, in response to detecting a change in the physical state, automatically poll other devices. Other mobile devices can be polled to determine a consensus of mobile devices with respect to an operational parameter of the devices and, based on the consensus, an appropriate response action can be initiated. The operations, according to an inventive arrangement disclosed herein, can be performed by a crowd-sourced device controller (CSDC).

In various embodiments, a CSDC can be implemented in and used in conjunction with different types of mobile devices, for example, a wireless communication device or a multi-purpose computing device that is endowed with communication capabilities. Such mobile devices include cellular phones, smartphones, laptop computers, and the like.

The CSDC can monitor the physical state associated with the user of the mobile device. As defined herein, "physical state" is a motional and/or locational state, and "change in physical state associated with a mobile device user" is a change (motional or locational) in the movement and/or location of the user. Accordingly, the CSDC can direct the mobile device to monitor a user's movement (motional state) to determine whether, for example, the user is moving or is stationary. As described more fully below, in some embodiments, the CSDC can drive one or more mobile device sensors to determine the number of steps taken by the user or determine whether the user is sitting rather than merely standing still. In other embodiments, the CSDC can direct the mobile device to determine the user's location (locational physical state). For example, as also described more fully below, the CSDC can direct the mobile device to submit a wireless request for a layout (e.g., map or floorplan) of the edifice that, as determined by a global positioning system (GPS) communicatively coupled with the mobile device, the user is currently situated in. The CSDC can couple mobile device-determined GPS coordinates with ones on a received map or floorplan to determine, for example, when the user enters or exits a specific area (e.g., building or room) indicated on the map or floorplan. In other embodiments described more fully below, the CSDC can determine the user's entry or exit into a specific area by directing the mobile device to detect changes, for example, in a beacon signal.

The CSDC can respond to a change, detected with mobile device sensors, in the physical state associated with the user by initiating relevant device polling. As defined herein, "relevant-device polling" is the listening for and receiving from select devices within range of the mobile device one or more signals indicating the operational status of the select devices. A "relevant device," as defined herein, is a device that meets a predetermined distance and/or location criterion. For example, other devices within a specified distance (location criterion) of the mobile device can be determined to be relevant devices. In other instances, however, other devices within a specific room or structure can be determined to be relevant devices irrespective of the other devices' distance relative to the mobile device. The distinction can be illustrated, for example, by a user who is entering a theater or conference room adjoining a lobby. As the user enters, other devices carried by individuals in the lobby may be nearer to the mobile device carried by the user, but the relevant devices are those carried by individuals in the theater or conference room.

The CSDC, as described more fully below, can direct the mobile device to identify the relevant devices and to poll the relevant devices irrespective of other, albeit nearer, non-relevant devices carried in the lobby. In general, relevance is reflected in the shared objective of certain mobile device users and not necessarily the distance between them. Individuals in a theater or conference room, for example, likely share with a mobile device user entering the theater or conference room the objective of watching a performance or participating in a conference, whereas other individuals in a lobby or adjoining room irrespective of physical proximity are less likely to share the same objective. The CSDC, by distinguishing between the two classes of mobile devices in the theater or conference room, can ensure that polling is a relevant-device polling of relevant mobile devices.

The CSDC can determine an operational parameter of the mobile device based on a relevant device consensus determined by the relevant-device polling. "Relevant device consensus," as defined herein, is a predetermined proportion of relevant devices that are operating according to a specific setting of an operational parameter. Optionally, a CSDC user can vary the proportion that the CSDC recognizes as a consensus, depending on a desired sensitivity. An operational parameter can be the sound volume of the mobile device, for example. An operational parameter, for example, can be the brightness of a display screen on the mobile device.

By determining the setting for an operational parameter based the relevant-device consensus, the CSDC can initiate a response action by the mobile device. The response action can be to provide an indication (e.g., an image generated on a mobile device display screen) of the appropriate setting for the operational parameter, thereby alerting the user to the advisability of changing one or more operational parameters of the mobile device. Alternatively, the CSDC can direct the mobile device to automatically change settings for one or more operational parameters. In the event, that the CSDC directs the mobile device to automatically change the one or more operational parameter settings, the CSCD optionally can also indicate the change to the user and provide the user an opportunity to override the change.

One aspect of the methods, systems, and computer program products disclosed herein is performing polling in response to detecting physical states (e.g., locational and/or motional) rather than performing periodic polling at arbitrarily set times. With polling at periodic intervals (e.g., 10-minute intervals), polling can occur at an inopportune time. For example, a user may already have settled into a theater seat or be engaged in conversation with the host of an event when the user's mobile device, in response to an arbitrarily timed polling of nearby devices, emits a sound prompting the user to mute the mobile device. The untimely prompt is likely to be as disruptive as the sound of a ringtone for an incoming call or message due to the user's failure to mute the mobile device upon sitting down in a theater or entering a conference room. The likelihood of such untimely prompting is mitigated by conditioning the prompting on detecting a change in physical state (e.g., motional and/or locational) as with the methods, systems, and computer program products disclosed herein. Generally, an opportune time to change the operational parameters of a mobile device (e.g., reduce sound volume, dim display brightness) is when a user has ceased movement and is settled into a position in a room or has first entered the room or a building. One aspect of the methods, systems, and computer program products disclosed herein is the ability to recommend the setting of, or change to, an operational parameter of a mobile device at precisely such opportune moments.

Another aspect of conditioning the prompting on detecting a change in physical (motional and/or locational) state is enhancement of hardware performance of the mobile device. Rather than reducing battery life and/or using bandwidth unnecessarily for repeated polling at periodic intervals, physical state-condition polling occurs only if and when certain changes in physical state occur. Conserving the resources of the mobile device is also enhanced by avoiding repeatedly recommending a change or re-setting of an operational parameter of a mobile device at periodic intervals. During an intervening period between periodic polling, the composition of mobile devices changes as a result of individuals entering or leaving a room or relevant area. If a mobile device's setting is based on the settings of a majority of nearby devices, and based on the current composition the ratio is near a threshold, the re-setting or repeated recommending of a change in settings can oscillate with each new poll owing to a slight change in the composition of mobile devices. Conditioning polling on detecting a change in physical state (motional and/or locational) can avoid these problems.

Yet another aspect of conditioning action on detecting a change in physical state (motional and/or locational) of a mobile device user relates to that user who, for example, leaves an event but forgets to reactivate a mobile device that is still in an inactive mode (e.g., mute, airplane mode, or other inactive setting). The "good citizen" user who (with or without prompting) appropriately sets the operational parameters of a mobile device to avoid a disruption, not uncommonly forgets to reset the operational parameters later. For example, a user may miss one or more important calls received long after the user leaves a conference room, theater, place of worship, or other social gathering place and forgets to reactivate a muted ringtone of a mobile phone. The problem is mitigated by the methods, systems, and computer program products disclosed herein by detecting that a user who has been sitting for an extended time (e.g., watching a movie) is now standing and moving or is exiting a building or room. By detecting the change in movement and/or location of the user, a mobile device incorporating the capabilities of a CSDC, as disclosed herein, can act to mitigate the likelihood of such occurrences.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 depicts mobile device 100, which is representative of a mobile device (e.g., smartphone) that incorporates a CSDC. Mobile device 100 illustratively includes processor 102, memory 104, and bus 106, which electronically couples various components including the processor 102 to the memory 104. Processor 102 can be implemented using suitable hardware (e.g., microprocessor or other integrated electronic circuitry) for performing arithmetical, logical, input/output (I/O) and other operations based on instructions passed by an operating system (OS). Memory 104 can include computer-readable media in the form of volatile memory, such as random-access memory (RAM) 108 and/or cache memory (not explicitly shown). Storage system 110 can be provided for reading from and writing to a non-removable, non-volatile magnetic media. Memory 104 can include at least one program product having one or more program modules that are configured to carry out the functions of various embodiments, including those of a CSDC as described herein. Bus 106 can comprise any of several types of bus structures, including a memory bus or memory controller, a peripheral bus, an accelerated graphics port, and a processor or local bus using any of a variety of bus architectures.

Program/utility 112, comprising one or more program modules, can be stored in memory 104 and can include an OS, one or more application programs, other program modules, and program data. The program modules can carry out the functions and/or methodologies of various embodiments such as those of a CSDC as described herein. Program/utility 112 is executable by processor 102. Program/utility 112 and any data items used, generated, and/or operated upon by mobile device 100 are functional data structures that impart functionality when executed with processor 102.

Mobile device 100 also illustratively includes a screen or display 114 and keyboard 116 with which a user interacts with the mobile device. Alternatively, the mobile device can include a touchscreen for entering commands by touching the touchscreen and/or speech-recognition circuitry to enable the user to enter commands and receive output audibly. Optionally, mobile device 100 can include an adapter 118 with which to communicate with one or more networks such as a local area network (LAN), a general wide area network (WAN), and/or a public network (e.g., the Internet).

Mobile device 100 also can include a transceiver for enabling communications via a radio frequency link to a network (e.g., a cellular network) of communication devices or directly to other communication devices (e.g., infrared, Bluetooth, Wi-Fi). The transceiver is illustratively implemented in circuitry 120. For purposes of voice communication, circuitry 120 can be operatively coupled to microphone 122 and speaker 124. Circuitry 120 also can include one or more different types of mobile device sensors (GPS, accelerometer, pedometer), the specific functions of which are described below with reference to FIG. 2.

Incorporated in mobile device 100, is CSDC system 126. In one embodiment, CSDC system 126 can be implemented in mobile device 100 as a set of processor-executable instructions. As a set of processor-executable instructions, CSDC system 126 can be electronically stored in memory 104 and executed by processor 102 when conveyed electronically via bus 106 to the processor 102. CSDC system 126, for example, can comprise an application downloaded to mobile device 100 or a built-in component of the OS of the mobile device. In other embodiments, a CSDC system can be implemented in hardwired circuitry or a combination of circuitry and processor-executable instructions. Accordingly, in a mobile device having only limited or no processing capabilities, all or a portion of the functions of the CSDC system can be implemented in hardwired circuitry.

Figure 2:
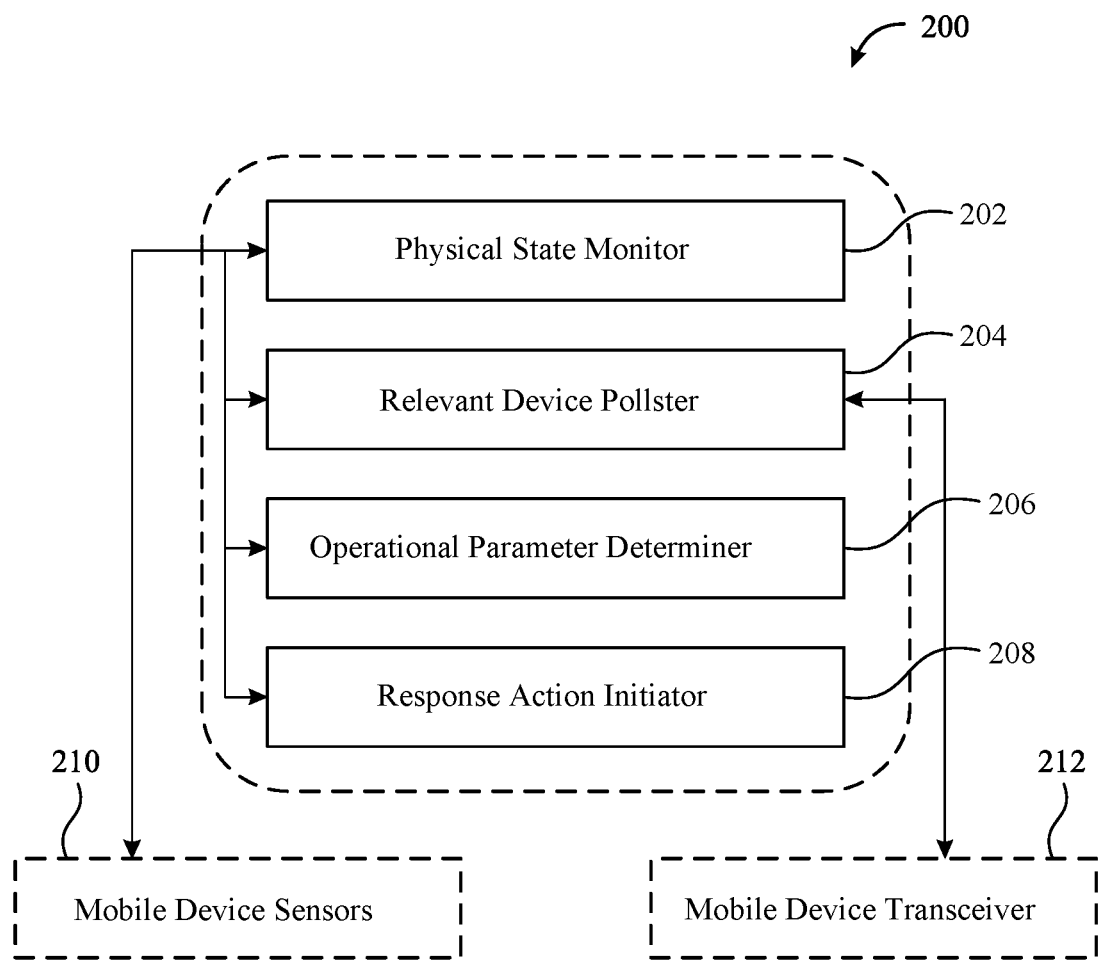
FIG. 2 depicts a crowd-sourced device control system according to an embodiment of the invention.

FIG. 2 illustrates CSDC system 200, an example of a CSDC system according to one embodiment. CSDC system 200 illustratively includes physical state monitor 202, relevant device pollster 204, operational parameter determiner 206, and response action initiator 208 that are each operatively coupled to one another. In accordance with the above descriptions, one or more of physical state monitor 202, relevant device pollster 204, operational parameter determiner 206, and response action initiator 208 can be implemented in processor-executable instructions, hardwired circuitry, or a combination of hardwired circuitry and processor-executable instructions.

Operatively, physical state monitor 202 monitors a physical state associated with a user of the specific mobile device in which CSDC system 200 is integrated. Physical state monitor 202 can be operatively coupled to one or more mobile device sensors 210 integrated in the mobile device. Mobile device sensors 210 can include, for example, an accelerometer, pedometer, or other motion sensor, such as a micromachined microelectromechanical system (MEMS) accelerometer that is well-adapted for use in mobile devices. Mobile device sensors 210 sense movement of the mobile device (e.g., magnitude and direction) and can thus be used by CSDC system 200 to detect changes in the physical state associated with a user of the mobile device. For example, an accelerometer integrated in the mobile device can detect when a user stands up, sits down. Specifically, physical state monitor 202 can use data generated by mobile device sensors 210 detect a change in the physical state (motional state) associated with the user carrying the mobile device. For example, physical state monitor 202 can detect that a user had been moving, has ceased moving, and is now stationary or, conversely, was stationary and is now moving. Optionally, physical state monitor 202 can incorporate a timing function to determine a length of time between motional changes in the user's physical state. Physical state monitor 202, based on the determined length of time, can distinguish a pause in the user's continued movement from a user's settling into a position that the user has remained for some time or is likely to remain for an extended period (e.g., by settling into a theater seat or taking a seat at a conference table). Likewise, based on the determined length of time, the physical state monitor 202 can distinguish a brief movement (e.g., standing to reach across a table before sitting back down) from a sustained movement corresponding to the user moving on from one distinct location to a different location.

Alternatively, or additionally, the distinction between limited and sustained movement of the user can be made by physical state monitor 202 based on motion of the user sensed by, for example, a pedometer integrated in the mobile device as part of mobile device sensors 210. For example, physical state monitor 202 distinguishes between the user taking only a limited number of steps before becoming stationary (even if a rest-movement-rest sequence is repeated) and a sustained movement of the user. The usefulness of the distinction can be illustrated by a user who has silenced a mobile device and does not need to be prompted any further while, for example, moving from one spot to another to chat with different individuals during a cocktail party or, for example, occasionally standing and stretching during a lengthy conference during most of which the user is sitting. Repeated prompting in such circumstances—if done periodically (e.g., every 10 minutes), for example—is both unnecessary and annoying.

In response to a user's sustained movement or movement after a sufficiently long interval of non-movement, relevant device pollster 204 can initiate polling of relevant devices. Relevant device pollster 204 can communicatively couple to mobile device transceiver 212 integrated in the mobile device to transmit signals (e.g., Bluetooth, Wi-Fi) to other mobile devices. From response signals of the other devices received by mobile device transceiver 212, relevant device pollster can determine the proportion of other devices having a particular operational parameter setting (e.g., what percentage of devices are muted). Relevant device pollster 204 initiates the polling in response to physical state monitor 202 detecting the change in the (motional) physical state associated with the user of the mobile device.

The operative actions are illustrated by a mobile phone in which CSDC system 200 is integrated and which, for example, is in "airplane mode" when an airliner in which the mobile phone user has been traveling lands and taxis to the airport gate. The mobile phone user stands up after sitting for an extended period. The movement is detected by physical state monitor 202 and, in response, relevant device pollster 204 begins polling other mobile devices aboard the airliner. Although the mobile device user may have forgotten that the mobile phone was still in airplane mode, operational parameter determiner 206 determines based on the polling that a certain portion of the other passengers' mobile devices are now re-activated. Response action initiator 208 can initiate an appropriate response action such as alerting the mobile phone user to switch from airplane mode to active mode or automatically switching the mobile phone to active mode.

The preceding example illustrates the operative response of CSDC system 200 to changes in motional physical states associated with a mobile device user. Physical state monitor 202, however, can detect other changes in physical states associated with a mobile device user. Physical state monitor 202 can alternatively or additionally detect changes in a mobile device user's locational physical state, for example. Accordingly, physical state monitor 202 can detect a mobile device user moving from one location to another by detecting the mobile device user entering or exiting a room or a building, for example.

In one embodiment, to detect changes in physical state (locational) associated with the user, physical state monitor 202 can direct the mobile device to transmit a request for a layout of an area corresponding to the current location of the user's mobile device. The location can be identified by a set of coordinates generated by a GPS communicatively coupled with the mobile device. The layout of the corresponding area can be a map, building blueprint, or floorplan, for example. The mobile device can connect to a communications network (e.g., cellular network) and transmit the request over a communication link to a public entity (e.g., county records office) or private contractor that maintains a registry or repository of layouts (e.g., maps, blueprints, floorplans) that include GPS coordinates and that are rendered in an electronic format. The requested layout can be received via the communication link and downloaded to the mobile device. Physical state monitor 202 can correlate the received layout with GPS coordinates corresponding to the location of the mobile device, the GPS coordinates changing as the user of the mobile device moves within the area corresponding to the downloaded layout. The layout can comprise two contiguous regions separated by a real or virtual threshold. The threshold, for example, can be a virtual plane defined by an entranceway between the outside and inside of a building or between two adjoining rooms within the building. Based on the GPS coordinates juxtaposed with location points on the layout, physical state monitor 202 can determine when the mobile device user crosses a threshold separating one location and another. Physical state monitor 202 can determine, based on the GPS coordinates juxtaposed with location points on the layout, when the mobile device user enters or exits a building or a specific room within the building, for example.

Figure 3:
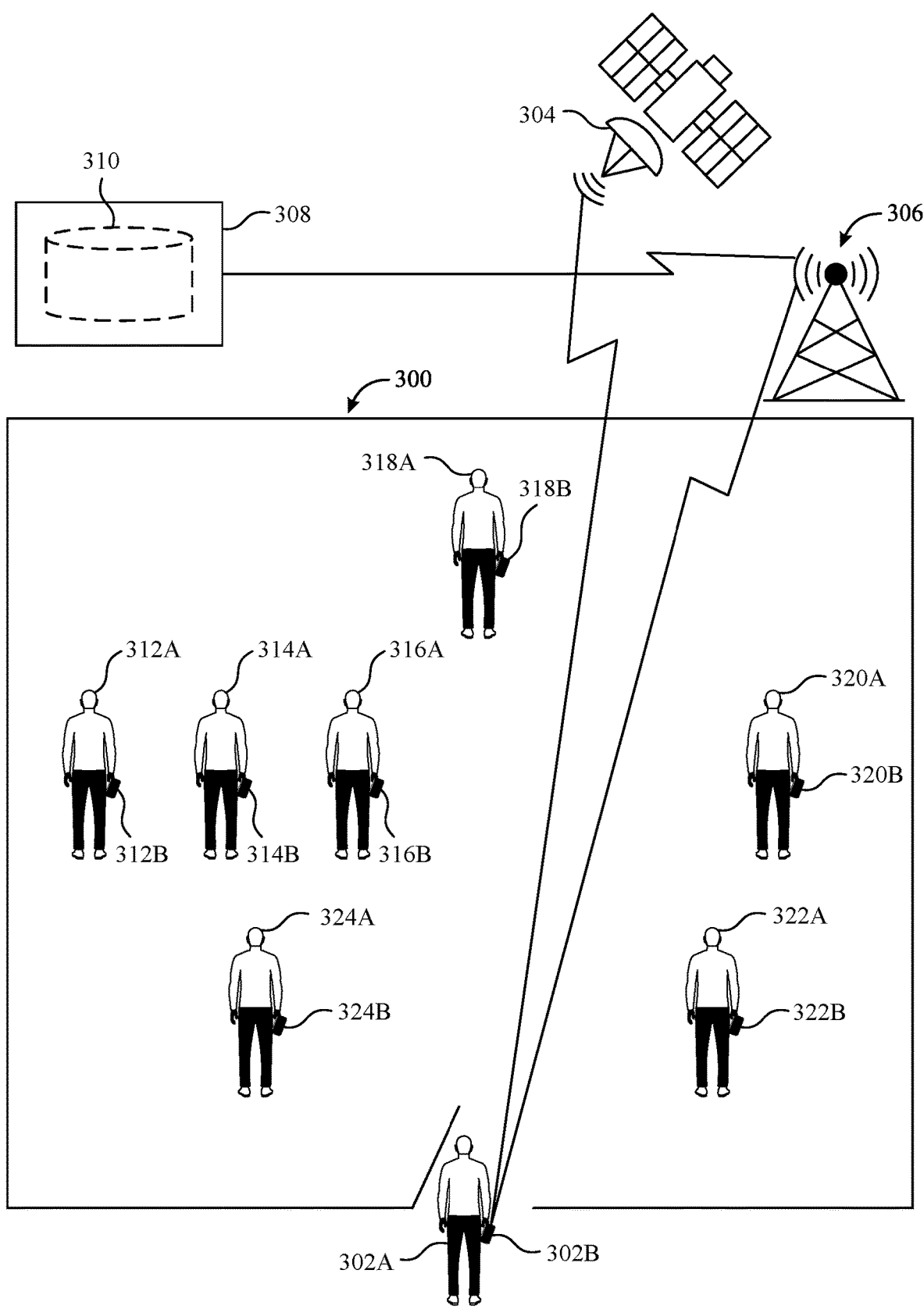
FIG. 3 illustrates certain operative aspects of a crowd-sourced device control system according to an embodiment of the invention.

Operative features of this aspect of a CSDC system are illustrated in FIG. 3. At location 300, user 302A carries a mobile phone 302B. Mobile phone 302B incorporates a CSDC system configured to detect and respond to changes in a physical state (locational) associated with user 302A. The CSDC system directs mobile phone 302B to request a floorplan corresponding to location 300. The CSDC system uses GPS coordinates generated by GPS 304 communicatively coupled with mobile device 302B to indicate the current location of user 302A. Mobile phone 302B transmits the request with corresponding GPS coordinates via cellular network 306 (or other suitable communication network) to entity 308, which maintains registry 310 of floorplans that include corresponding GPS coordinates. The appropriate floorplan is identified by the GPS coordinates provided in the request and is transmitted via cellular network 306 to mobile phone 302B. The CSDC system, still relying on GPS coordinates generated by GPS 304, detects when user 302A enters the room identified in the floorplan in response to changes in the GPS coordinates.

As with respect to a change in the motional physical state, the CSDC system can initiate polling in response detecting a change in the physical state (locational) of a mobile device user. Referring still to FIG. 3, the CSDC system incorporated in mobile phone 302B responds to detecting that user 302A enters the room at location 300 by polling within-range mobile devices deemed relevant by the CSDC system. The CSDC system polls relevant devices by transmitting to and, in response, receiving from relevant devices a wireless signal, such as Bluetooth or Wi-Fi signal. A response signal can include location information indicating the location of a responding mobile device. Device users 312A, 314A, 316A, 318A, 320A, 322A, 324A in the room at location 300 carry mobile devices 312B, 314B, 316B, 318B, 320B, 322B, 324B, respectively. Users 312A-324A are likely to be located inside the room for a common purpose (e.g., attending a conference). The CSDC system can determine that mobile devices 312B-324B are relevant devices (as opposed to any devices carried by device users outside the room) based on specific location information contained in the response-to-query signals conveyed by mobile devices 312B-324B. Based on the polling, the CSDC system can determine a consensus of mobile devices 312B-324B. If the consensus is that a predetermined proportion (e.g., greater than 50 percent) are muted, the CSDC system can initiate a response action. The response action can be a suggestion that user 302A likewise mute mobile phone 302B. Alternatively, the CSDC system can cause the mobile phone 302B to automatically mute without user interaction. In the latter case, the CSDC system optionally can notify the user of the action and enable the user to override the action if the user chooses to do so.

In one embodiment, the CSDC system can provide the user a capability to pre-set the CSDC system to detect the user's arrival at a pre-specified location. For example, in anticipation of an important meeting, the user can pre-set the CSDC to store specific GPS coordinates where the meeting will occur. Upon arrival, the CSDC can avoid polling and instead automatically apply a predetermined setting to one or more operational parameters of the mobile device, while also initiating a broadcast of corresponding information to other mobile devices that may or may not already be polling. The information can assist the other mobile devices, for example, by suggesting one or more appropriate operational parameter settings. In another embodiment, the CSDC system can provide the user a capability to pre-schedule enablement of the CSDC system each time mobile device GPS coordinates are recognized indicating the user's arrival at a location that the user visits on a regular or semi-regular basis, such a neighborhood movie theater. In response to detecting with the mobile device GPS coordinates indicating that the user has arrived at the location, the CSDC system can likewise avoid polling and instead automatically apply a predetermined setting to one or more operational parameters of the mobile device (e.g., silencing mobile phone), while again initiating a broadcast of corresponding information to other mobile devices that may or may not already be polling. Upon detecting, the user leaving the location (e.g., exiting the theater), the CSDC can automatically initiate any needed response action (e.g., reactivate mobile phone upon exiting the theater).

In other embodiments, the CSDC system can rely on other types of signals, such as Wi-Fi or Bluetooth, to detect changes in physical state (locational) associated with a mobile device user. The CSDC system, in one embodiment, can identify when the user arrives at or enters a specific location by detecting a signal (e.g., or Bluetooth) indicating a specific network. The signal can convey a network name that correlates to a specific location (e.g., movie theater) or point of interest. Accordingly, upon entering the specific location or point of interest (e.g., building or a specific room in the building) and detecting the signal (e.g., Wi-Fi or Bluetooth), the CSDC system can respond by initiating polling in response to the newly detected signal. In another embodiment, multiple mobile devices can each employ a CSDC system. Each such CSDC system can respond to another mobile device's CSDC polling by transmitting locational data (e.g., via Wi-Fi or Bluetooth signal) as well as operational parameter settings. When a user enters a building or a specific room in the building, the user's mobile device CSDC system can poll other mobile devices also having CSDC systems. Based on response signals received, the user's CSDC system can determine which mobile devices are relevant devices based on transmitted location data and can poll those specific devices.

A CSDC system, in another embodiment, can detect and respond to a change in the (locational) physical state of a mobile device user based on one or more beaconing signals at a venue. For example, a movie theater proprietor may employ beaconing signals to convey advertisements of upcoming movies or current concession-stand products via wireless beacon signals to mobile devices carried into the theater by theatergoers. A CSDC system incorporated in a theatergoer's mobile device, for example, can detect a change in the (locational) physical state of the theatergoer when the beacon signal is received by the mobile device. Upon detection of the beacon signal, the CSDC system can initiate polling either when the beacon signal is initially encountered or, if relying on a downloaded floorplan of the theater, when the user exits the lobby and enters the theater. A theatergoer who earlier, in anticipation of arriving at the movie theater and not wanting to forget to mute a mobile phone, can thus be reminded to mute the mobile phone based on the CSDC system's polling of mobile devices of other theatergoers before or when the user enters the theater.

In yet another embodiment, the CSDC system is implemented as a central service communicatively coupled to multiple mobile devices that are registered with the service. The central service wirelessly connects to the various registered mobile devices via a wireless communication network (e.g., cellular phone network). The central service can track the movements and/or locations of mobile devices based, for example, on coordinates generated by a GPS. The central service can detect a change in the physical state (e.g., motional or locational) associated with a user of a registered mobile device and can initiate relevant-device polling in response to detecting the change. The central service, based on location information conveyed by service-registered mobile devices, can determine those mobile devices deemed relevant with respect to the mobile device on whose behalf the polling is initiated. A relevant-device consensus can be determined by the central service based on the polling. Based on common or individualized rules (e.g., consensus requires greater than 50 percent of mobile devices), the central service can determine an operational parameter and initiate a response action, such as recommending to the user that the operational parameter be changed or automatically setting the operational parameter without user interaction (optionally subject to override by the user). Alternatively, the central service, based on tracking movements and/or locations of registered and enabled mobile devices, can make the information available in localized, anonymized packages to service-registered mobile devices situated in a corresponding area, thereby enabling each mobile device user to decide the operational parameter setting for the user's mobile device or enabling each mobile device to set the operational parameters automatically based on the information provided.

Figure 4:
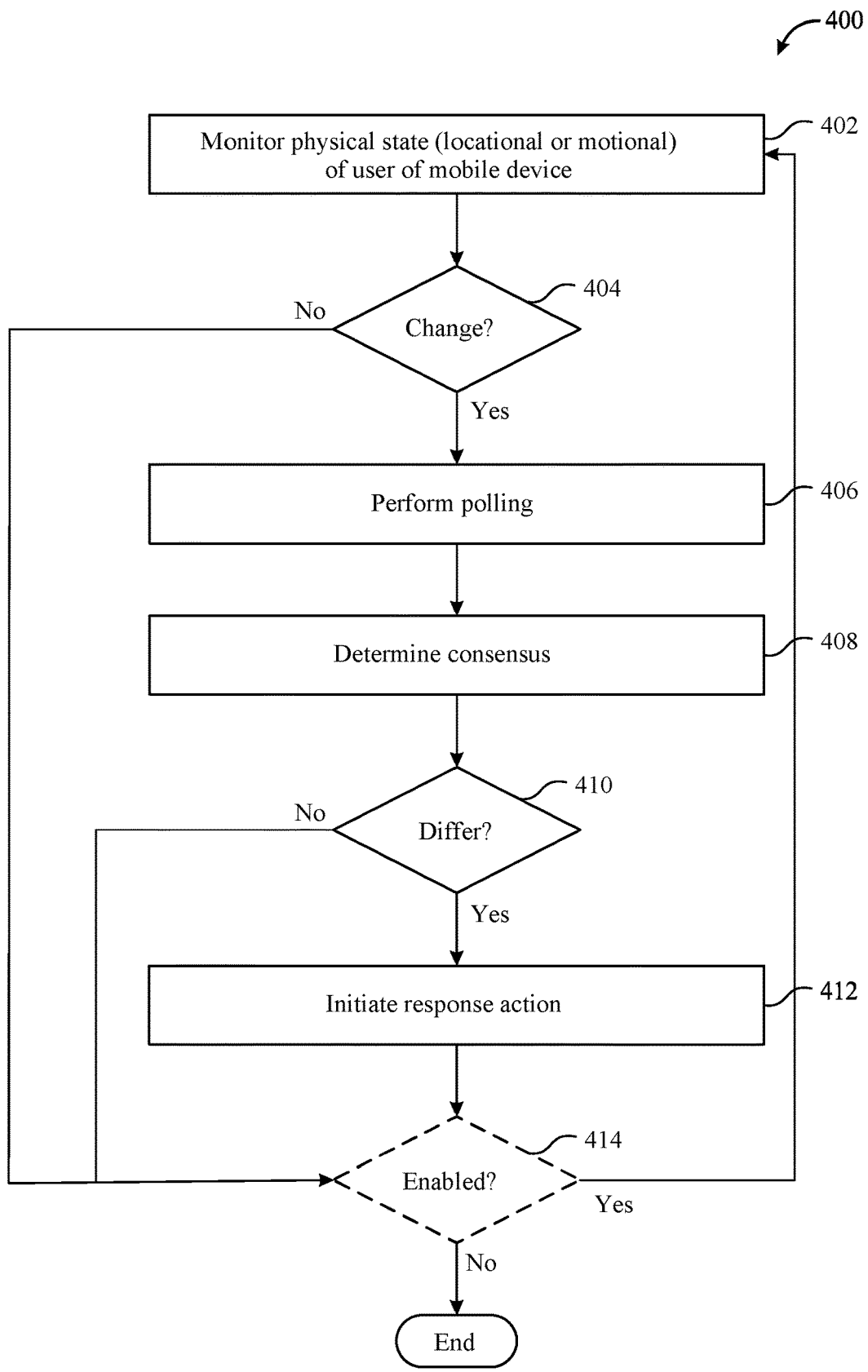
FIG. 4 is flowchart of a method for crowd-sourced device control according to an embodiment of the invention.

FIG. 4 is flowchart of method 400 for crowd-sourced device control, according to one embodiment. Method 400 can be performed by a system the same as or similar to the systems described in reference to FIGS. 1-3. The system at block 402 monitors, with a mobile device, a physical state associated with a user of the mobile device. In response to detecting a change in the physical state (e.g., motional or locational) associated with the user at decision block 404, the system performs relevant-device polling with the mobile device at block 406. The system determines an operational parameter setting for the mobile device based on a relevant-device consensus at block 408. If at decision block 410 the operational parameter setting—as determined based on the relevant-device polling—is different than a current setting of the operational parameter, then a response action is initiated at block 412. Optionally, if at decision block 414 the system remains enabled, the system can continue monitoring the physical state associated with the user of the mobile device.

The change in user-associated physical state monitored by the system can be a motional change. The change can be monitored using a motion sensor (e.g., accelerometer, pedometer) integrated in the mobile device. The system can detect if the change is a cessation of user movement following a sustained period of movement, or resumption of movement after a period of non-movement. Thus, for example, the system can detect when a user, who has been moving, settles into a theater seat or sits down at a conference table. Likewise, when the user, stands (e.g., using the mobile device's accelerometer to detect direction and magnitude of the change in movement) or otherwise begins moving after a period of relative motionlessness, the system can detect the change and initiate polling. The system can include a timing function to distinguish a sustained change in movement from a brief change, such as when the user is moving from one location to another for brief periods of conversation with other individuals during a business or social event.

Alternatively, or additionally, the system can distinguish sustained movements from brief movement based on the number of the user's steps (e.g., using a pedometer incorporated in the mobile device). Distinguishing sustained movement from brief or episodic movements can avoid unnecessary repetition of polling when there is no need to re-set operational parameters of the mobile device. For example, the user, having muted a mobile phone after joining a conference or social event, need not be repeatedly reminded to change the setting when merely standing for a moment, temporarily moving away from a conference table, moving between groups of individuals, or the like.

The system additionally or alternatively can detect a change in physical state that is a locational change. In one embodiment, the system can direct the mobile device to transmit a request for a layout (e.g., map, blueprint, floorplan) from a public entity (e.g., county records office) or private contractor that maintains a registry or repository of layouts that include GPS coordinates and that are rendered in an electronic format. The request can include location coordinates rendered by a GPS communicatively coupled with the mobile device and indicating a current location of the mobile device. Based on the GPS coordinates of the mobile device juxtaposed with location points on the layout. The layout can comprise two contiguous regions separated by a real or virtual threshold. The system can determine when the mobile device user crosses the threshold. The threshold, for example, can be a virtual plane defined by an entranceway between the outside and inside of a building or between two adjoining rooms within the building. Accordingly, the system can detect when the mobile device user enters or exits a building or a specific room within the building, for example.

Figure 5:
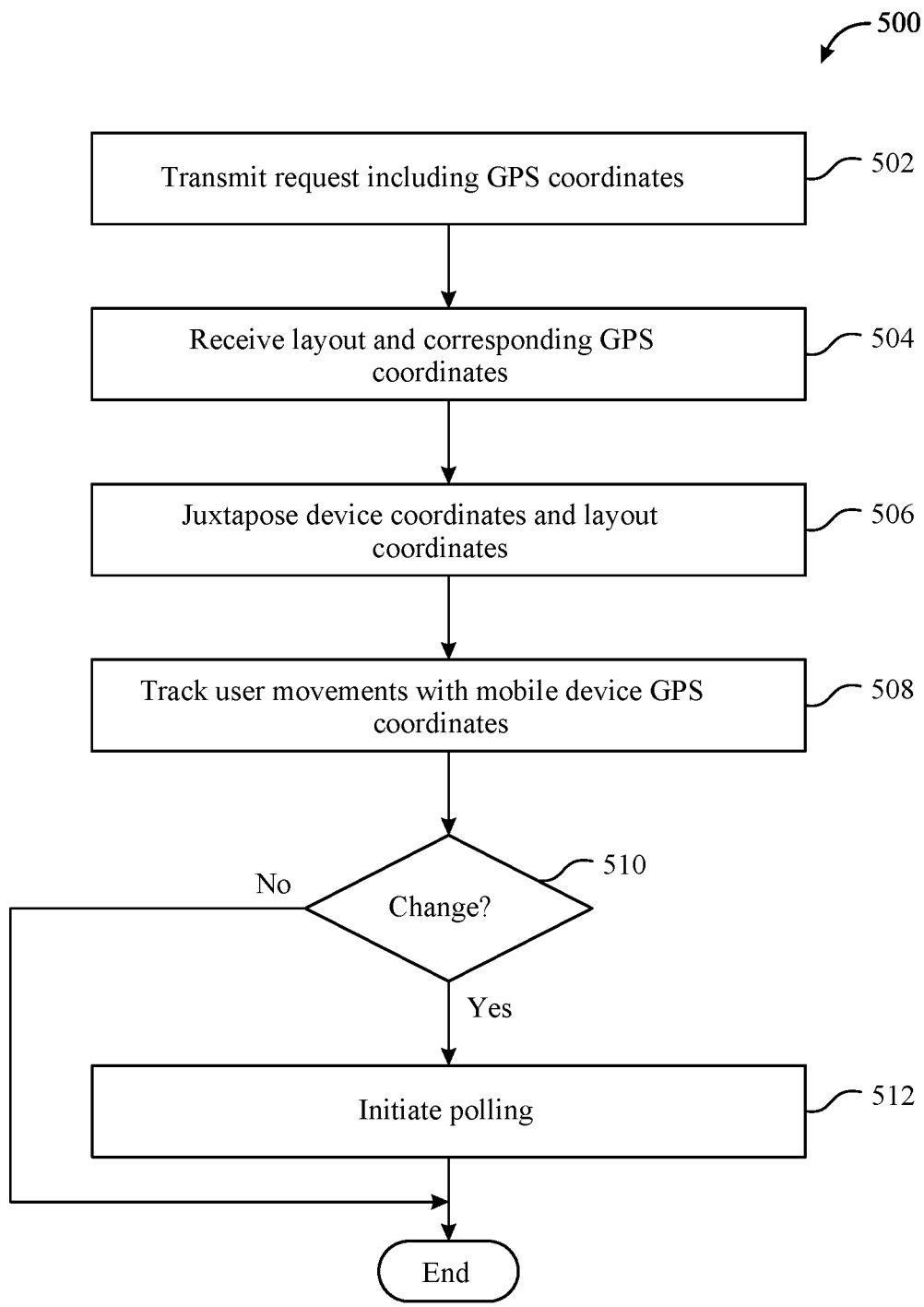
FIG. 5 is a flowchart of a method for crowd-sourced device control according to an embodiment of the invention.

Referring additionally to FIG. 5 example operations 500 of the system are depicted with respect to detecting physical state changes associated with the mobile device user, wherein the changes correspond to locational changes such as entering or exiting a building or a room within the building. At block 502, the system can direct a mobile device to transmit a request, which includes GPS coordinates of the current location of a user the mobile device, to a public or private entity that maintains a repository of layouts (e.g., map, blueprint, floorplan) with corresponding GPS coordinates which can be conveyed in an electronic format. Upon receipt and downloading of the layout and corresponding GPS coordinates to the mobile device, the system at block 506 can juxtapose the device GPS coordinates and those of the corresponding layout. At block 508, the system can track movement of the mobile device using the GPS coordinates. If at decision block 510 the system detects the user moving from a location to another, such as moving from one room to another or crossing a threshold into or out of a building or a room, the system can initiate polling at block 512.

The relevant devices polled by the system at block 512 are other mobile devices whose relevance is determined by the specific location of the mobile devices irrespective of distance to the mobile device performing the polling. That is, the relevant devices are mobile devices that are carried by individuals deemed likely to share a common objective (e.g., viewing a movie, participating in a conference, or leaving a theater or conference room) with the individual carrying the mobile device that performs the polling, the likelihood based on the polled mobile devices' presence in the same room, building, or other location as the polling mobile device. The system can determine an operational parameter setting for the mobile device based on the polling and, if the operational parameter setting is different than a current setting of the operational parameter, then the system can initiate a response action (e.g., suggesting or automatically performing a reduction of the mobile device sound volume or a dimming of a display screen on the mobile device), as described above.

The terminology used herein is for the purpose of describing particular embodiments only and is not intended to be limiting. Notwithstanding, several definitions that apply throughout this document now will be presented.

As defined herein, the terms "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human interaction or intervention.

As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, the terms "if," "when," and "upon" mean "in response to" or "responsive to," depending upon the context. Thus, for example, the phrases "if it is determined" and "if [a stated condition or event] is detected" are to be construed to mean "in response to determining" or "in response to detecting [the stated condition or event]" or "responsive to detecting [the stated condition or event]" or "in response to detecting [the stated condition or even]," depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the phrase "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "user," and "individual" mean a human being. Likewise, the terms "users" and "individuals" mean human beings.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method within and by a mobile device associated with a user, comprising:
   monitoring for a motional change of the user;
   performing, responsive to the motional change being detected for a sustained period of time, relevant-device polling of a plurality of relevant-devices;
   determining an operational parameter setting for the mobile device based on a relevant-device consensus determined by the relevant-device polling; and
   initiating a response action by the mobile device responsive to the operational parameter setting, as determined based on the relevant-device consensus, being different than a current setting of the operational parameter, wherein
   each one of the plurality of relevant-devices is identified as being relevant independently of a distance to the mobile device of the respective one of the plurality of relevant-devices, and
   wherein the each one of the plurality of relevant-devices being identified as being relevant independently of the distance to the mobile device of the respective one of the plurality of relevant-devices involves excluding a subset of the plurality of relevant-devices based upon the subset of the plurality of relevant-devices not having a shared objective with the user of the mobile device.

2. The method of claim 1, wherein
   the motional change comprises:
      the user ceasing movement or,
      after being stationary, resuming movement as determined by a motion sensor of the mobile device.

3. The method of claim 1, wherein
   the response action is to suggest or automatically perform a reduction of sound volume of the mobile device or a dimming of a display screen on the mobile device.

4. A system including a mobile device associated with a user, comprising:

a processor of the mobile device configured to initiate operations of the mobile device including:
monitoring for a motional change of the user;
performing, responsive to the motional change being detected for a sustained period of time, relevant-device polling of a plurality of relevant-devices;
determining an operational parameter setting for the mobile device based on a relevant-device consensus determined by the relevant-device polling; and
initiating a response action by the mobile device responsive to the operational parameter setting, as determined based on the relevant-device consensus, being different than a current setting of the operational parameter, wherein
each one of the plurality of relevant-devices is identified as being relevant independently of a distance to the mobile device of the respective one of the plurality of relevant-devices, and
wherein the each one of the plurality of relevant-devices being identified as being relevant independently of the distance to the mobile device of the respective one of the plurality of relevant-devices involves excluding a subset of the plurality of relevant-devices based upon the subset of the plurality of relevant-devices not having a shared objective with the user of the mobile device.

5. The system of claim 4, wherein the motional change comprises:
the user ceasing movement or,
after being stationary, resuming movement as determined by a motion sensor of the mobile device.

6. A computer program product, comprising
a computer readable hardware storage device having program instructions embodied therewith,
the program instructions executable by a processor of a mobile device associated with a user to cause the mobile device to perform:
monitoring for a motional change of the user;
performing, responsive to the motional change being detected for a sustained period of time, relevant-device polling of a plurality of relevant-devices;
determining an operational parameter setting for the mobile device based on a relevant-device consensus determined by the relevant-device polling; and
initiating a response action responsive to the operational parameter setting, as determined based on the relevant-device consensus, being different than a current setting of the operational parameter, wherein
each one of the plurality of relevant-devices is identified as being relevant independently of a distance to the mobile device of the respective one of the plurality of relevant-devices, and
wherein the each one of the plurality of relevant-devices being identified as being relevant independently of the distance to the mobile device of the respective one of the plurality of relevant-devices involves excluding a subset of the plurality of relevant-devices based upon the subset of the plurality of relevant-devices not having a shared objective with the user of the mobile device.

7. The computer program product of claim 6, wherein the motional change comprises:
the user ceasing movement or,
after being stationary, resuming movement as determined by a motion sensor of the mobile device.

8. The computer program product of claim 6, wherein the response action is to suggest or automatically perform a reduction of sound volume of the mobile device or a dimming of a display screen on the mobile device.

* * * * *